Patented Sept. 6, 1927.

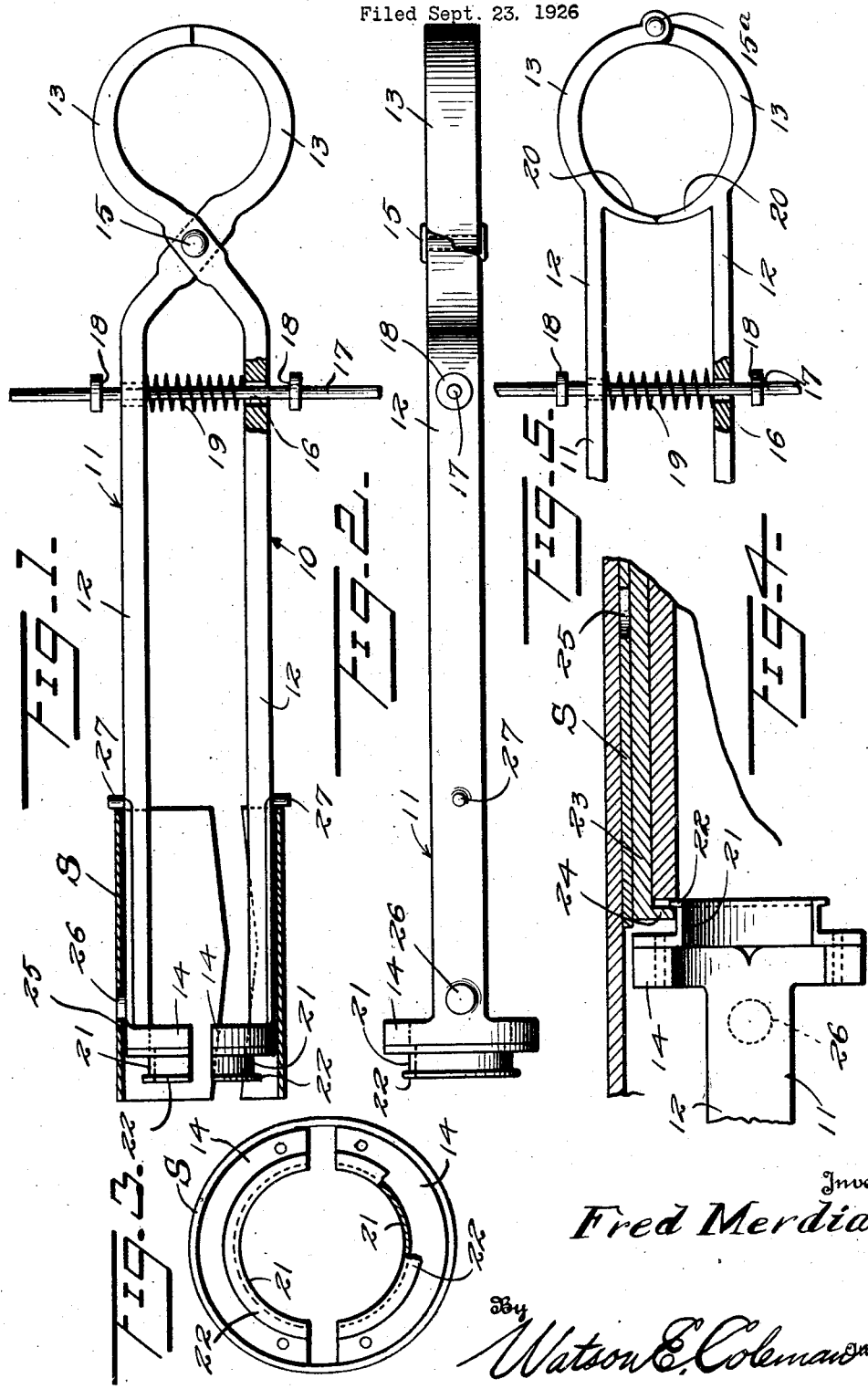

1,641,895

UNITED STATES PATENT OFFICE.

FRED MERDIAN, OF VANCOUVER, WASHINGTON.

TOOL FOR REMOVING AND INSERTING BEARING SLEEVES AND BEARINGS.

Application filed September 23, 1926. Serial No. 137,296.

This invention relates to tools for inserting and removing bearing sleeves and bearings and more particularly to an improvement on the structure shown in my prior application Serial No. 107,194, filed May 6, 1926, and allowed August 4, 1926, for tools for inserting and removing bearing sleeves.

An important object of the invention is to provide a device of this character having means for engaging and holding a split bearing sleeve while inserting and removing the same to or from the housing in which it is disposed.

A further object is to provide a device of this character having means for gripping the bearing located within the bearing sleeve to permit the same to be inserted or removed.

A still further object is to provide a device of this character having a tong-like structure including opposed semicircular portions which may be brought together to clamp the bearing sleeve so that the same may be reduced against its inherent resiliency, to a size such that it will readily enter the housing.

A further object of the invention is to provide a structure of this character such that the tong element may be employed for use in removing cotter pins and the like.

A still further object of the invention is to provide a device of this character in which the tong structure provides a means for limiting the movement of the elements employed to grasp the sleeve or bearing and withdraw the same so that the inherent resiliency of the tong handles which bear these portions may be employed to force the tongs apart and cause their proper engagement with the sleeve or bearing.

These and other objects I attain by the construction shown in the accompanying drawings, wherein for the purpose of illustration is shown a preferred embodiment of my invention, and wherein:—

Fig. 1 is a side elevation showing a tool constructed in accordance with my invention applied to a bearing sleeve to remove the same;

Fig. 2 is a side elevation of the tool at right angles to that shown in Fig. 1;

Figure 3 is an end elevation of the tool in position within the bearing sleeve;

Fig. 4 is a fragmentary sectional view showing the tool as applied to remove a bearing from its sleeve; and Fig. 5 is a side elevation of a modified form of tool.

Referring now more particularly to the drawings the numerals 10 and 11 generally designate the side members of the tool, each including a shank 12 having at one end thereof an arcuately curved portion 13 arranged in the same general plane as the shank and at the opposite end thereof an arcuately curved portion 14 arranged in a plane at right angles to the shank. The ends bearing the arcuately curved portions 13 are pivotally connected to one another at one end or the other of such arcuately curved portions.

In Figure 1 the pivot 15 is located at the inner ends of the arcuately curved portions 13 so that a pincer-like structure is provided while in Figure 5 the pivot 15ª lies at the outer ends of the arcuately curved portions and a tong structure is provided. Adjacent the inner ends of the arcuately curved portions the shanks 12 have openings 16 for the passage of the rod or bar 17 which may be provided with stops 18 limiting separation of the shanks and which intermediate the shank portions may be surrounded by a spring 19 which tends to force these shanks apart. The arcuately curved portions 13 when the noses 20 thereof come into engagement combine to provide a circular opening of less diameter than the external diameter of the sleeve S with which the device is to be employed. These noses may further be employed to clamp upon a cotter pin or the like so that the structure may be used to withdraw the same. The arcuately curved portions 14 are externally curved upon a radius equal to the internal radius of the sleeve when in applied position. The noses 20 of the arcuately curved portions 13, however, come into contact with one another before the diametrically opposed portions of the arcuately curved sections 14 are spaced apart a distance equal to the internal diameter of the sleeve in applied position so that it is necessary to flex the shanks 12 and in event the spring 19 is provided, to close these shanks against the spring before these sections may be inserted within the sleeve. Each of the sections 14 is slightly less in semi-circle so that the necessary constriction thereof may be had. Each section 14 has projecting from its inner edge a longitudinally extending flange 21, the free edge of which has an outturned rim 22. The flange 21 has an external diameter equal to the internal diameter of the bearing frame 23 at the end flange 24 thereof so that by proper compression of the shanks 12, the rims 22 may be inserted through the inner end of the bearing and will, when the shanks are released, engage against the inner face of the flange 24 to permit the bearing to be withdrawn. As is well known to those familiar with the art, the sleeves S employed with these bearings are longitudinally split to render the same compressible and to assist in withdrawing the same have an opening 25 formed in the wall thereof for reception of an implement. I accordingly provide one of the shanks 12 with an outwardly extending lug 26 which may engage in the opening 25 and be held therein by the resiliency of the arms and by spring 19 so that a pull combined with a rotative movement applied through bar 17 may be exercised to withdraw the sleeve. In order to assist in alining the lug 26 with the opening 25 the outer face of one or both shanks 12 has an outstanding lug 27 for engagement against the end of the bearing sleeve S when the lug 26 is alined with this opening.

It will be obvious that the structure hereinbefore set forth may be readily and cheaply and at the same time durably constructed and will greatly facilitate the work of removing bearings and sleeves from the housings thereof. It will also be obvious that this structure is capable of a certain range of change and modification without departing from the spirit of the invention and, therefore, I do not wish to limit myself to such specific structure except as hereinafter claimed.

I claim:—

1. A tool for inserting and removing bushings comprising a pair of arms connected at one end and resiliently urged apart at their opposite ends, the free end of one arm being provided with a lug for engagement in an opening in the bushing, the free ends of said arms being complementary to provide a substantially circular element adapted to engage within the bushing, said arms being provided at the opposite ends thereof with arcuately curved portions adapted to receive therebetween a bushing of the type with which the tool is to be employed and to compress the same to a diameter less than the internal diameter of the housing in which the bushing is to be inserted, said arcuately curved portions having nose portions engaging to limit movement of the free ends of the arms toward one another while the free ends of said arms are still spaced apart a distance greater than the internal diameter of the bushing with which the tool is to be employed.

2. A tool for inserting and removing roller bearings and the bushings thereof comprising a pair of arms connected at one end and resiliently urged apart at their opposite ends, the free end of one arm being provided with a lug for engagement in an opening in the bushing, the free ends of the arms being complementary to provide a substantially circular element to engage within and interiorly fit the bushing, and extensions on said arms providing a circular portion adapted to enter the end of the bearing and having an outturned flange for engagement with the bearing.

3. A tool for inserting and removing bushings comprising a pair of arms pivotally connected at one end and resiliently urged apart at their opposite ends, the last named ends of the arms being each provided with an arcuate extension disposed at substantially right angles to the arm, said arcuate extensions combining in one position of the arms to provide a substantially circular element adapted to engage within and interiorly fit the bushing, the opposite ends of the arms having portions engaging prior to the constriction of the ends of the arms a distance sufficient to permit said circular portions to engage within the bushing whereby the resiliency of said arms opposes movement of the arms toward one another which will permit withdrawal of the circular element from the bushing.

4. A tool for inserting and removing bushings comprising a pair of arms connected at one end and resiliently urged apart at their opposite ends, the free end of one arm being provided with a lug for engagement in an opening in the bushing, the free ends of said arms being complementary to provide a substantially circular element adapted to engage within the bushing, said arms being provided with opposed arcuately bowed portions adapted to receive therebetween a bushing of the type with which the tool is employed when the free ends of the arms are separated to the greatest extent.

5. A tool for inserting and removing bushings comprising a pair of plier connected elements the handle portions of which at the free ends thereof are complementary to provide a substantially circular element adapted to engage within the bushing, the jaw portions of the elements engaging while the free ends of the handle portions are still spaced apart a distance greater than the internal diameter of the bushing, one of said handle portions having a lug for engagement in an opening in the wall of the bushing.

6. A tool for inserting and removing roller bearings from the bushing thereof comprising plier connected members, the handle portions of said members each having at the free end thereof an arcuate extension, said extensions combining to provide a circular portion adapted to enter the bearing and each having at its free end an out-turned flange for engagement with the bearing, the jaw portions of said members having engagement with one another while the outer edges of said flanges are spaced apart a distance greater than the diameter of the opening in the bearing into which they must be extended.

In testimony whereof I hereunto affix my signature.

FRED MERDIAN.